United States Patent
Phillips

[11] 3,867,012
[45] Feb. 18, 1975

[54] NOVEL LITHIUM NIOBATE SINGLE CRYSTAL FILM STRUCTURE

[75] Inventor: William Phillips, Princeton, N.J.

[73] Assignee: RCA Corporation, New York, N.Y.

[22] Filed: Apr. 29, 1974

[21] Appl. No.: 464,763

[52] U.S. Cl............. 350/96 WG, 117/21, 117/107, 117/217, 204/192, 350/160 R
[51] Int. Cl......................... B44d 1/16, G02b 5/14
[58] Field of Search........... 117/71 R, 21, 217, 107; 204/192; 350/96 WG, 160 R

[56] References Cited
UNITED STATES PATENTS

| | | | |
|---|---|---|---|
| 3,657,029 | 4/1972 | Fuller | 117/217 |
| 3,795,433 | 3/1974 | Channin | 350/96 WG |
| 3,832,567 | 8/1974 | Jacques et al. | 350/96 WG |
| 3,833,284 | 9/1974 | Kaminow et al. | 350/96 WG |

OTHER PUBLICATIONS

Kuhn et al., Optical Guided Wave Mode Conversion by an Acustic Surface Wave, in Applied Physics Letters, 19(10), p. 428–430, November 15, 1971.

Miyazawa, S., Growth of $LiNbO_3$, Single-Crystal Film for Optical Waveguides, in Appl. Phys. Lett. 23(4), p. 198–200, Aug. 15, 1973.

Russo et al., Sputtered Ferroelectric Thin-Film Electro-Optic Modulator, in Appl. Phys. Lett., 23(5), p. 229–231, Sept. 1, 1973.

Primary Examiner—Cameron K. Weiffenbach
Attorney, Agent, or Firm—Glenn H. Bruestle; Birgit E. Morris

[57] ABSTRACT

A film of a single crystal lithium niobate film on a platinum coated lithium tantalate crystal can be prepared by depositing a thin layer of platinum on a polished lithium tantalate crystal surface, depositing a layer of finely divided lithium niobate on the platinum and fusing the lithium niobate. Such films are useful in optical waveguide electro-optic modulators and acoustic surface wave devices.

9 Claims, 2 Drawing Figures

NOVEL LITHIUM NIOBATE SINGLE CRYSTAL FILM STRUCTURE

The invention herein described was made in the course of, or under, a contract or subcontract thereunder, with the Office of Naval Research, Department of the Navy.

This invention relates to novel single crystal films and a method of making them. More particularly, this invention relates to films of lithium niobate deposited on a conducting substrate.

BACKGROUND OF THE INVENTION

Single crystals of lithium niobate are known to have excellent piezoelectric and electro-optic properties and are sufficiently physically and chemically stable to be used as light modulators which can modify the direction and certain properties of a transmitted coherent light wave by the application of an electric field. Single crystals can be prepared by Czochralski methods and can be cut and polished for use as light modulators. Recently, a simplified method of making single crystals of lithium niobate films was disclosed by Miyazawa, Applied Physics Letters, Vol. 23, No. 4, Aug. 15, 1973. Single crystal films of lithium niobate were grown epitaxially on lithium tantalate crystals by depositing powdered lithium niobate on a cut lithium tantalate substrate and fusing the lithium niobate. The resultant film acts as an optical waveguide. Such waveguides can be employed for modulators in optical waveguide devices when connected to a source of voltage, as by applying electrodes to the surface of the lithium niobate film. However, it would be desirable to make more sensitive modulators that can operate at higher frequencies.

SUMMARY OF THE INVENTION

According to the present method of making waveguides, an epitaxial single crystal film of lithium niobate can be formed on a conducting surface by depositing a coating of platinum on a polished surface of a single crystal of lithium tantalate, depositing a layer of finely divided lithium niobate onto the coated substrate and fusing the lithium niobate.

DETAILED DESCRIPTION OF THE INVENTION

A thin polycrystalline layer of conductive platinum can be applied to a cut and polished lithium tantalate single crystal surface in known manner, as by evaporating or by radio-frequency sputtering. The layer of platinum can be from about 150 to 2,500 angstroms thick, preferably from about 400 to 1,000 angstroms thick. The platinum layer can be a continuous layer, or discontinuous, e.g., it can be applied through a mask in a predetermined pattern, such as interdigitated fingers and the like. The platinum should extend, in at least one point, to the edge of the substrate crystal so that it can be connected to a source of voltage when it is to be used in electro-optic or acoustic devices.

Finely divided lithium niobate powder, that is, particles below about 30 microns in size and particularly from about 5 to 10 microns in size, are then deposited onto the platinum-coated lithium tantalate crystal surface. Suitable coatings can be applied from an aqueous dispersion of the powder by settling, or the dry powder can be applied directly.

The coated lithium tantalate crystal is then heated above the temperature required to fuse the lithium niobate powder, and preferably to above about 1,260°C. up to about 1,275°C. until the lithium niobate powder has fused. A period from about 5 to 10 minutes is generally adequate. The crystal is then cooled to room temperature.

Surprisingly, the lithium niobate film forms a single crystal layer which is epitaxial with respect to the lithium tantalate substrate despite the presence of the intervening platinum layer. Although the exact mechanism of this formation is not understood, it is believed that the platinum diffuses somewhat into the substrate layer, and that some of the tantalate ions diffuse through the platinum layer into the lithium niobate layer during the fusion step.

The resultant articles can be employed as waveguides which can be modulated efficiently with a transverse electric field, and in acousto-optic devices such as acoustic surface wave transducer launchers that can operate at high frequencies.

Figure 1:
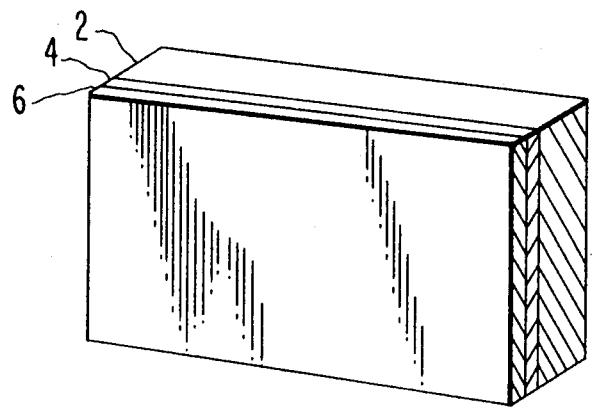
FIG. 1 is a perspective view of a single crystal film structure of the invention.

Referring now to FIG. 1, a waveguide, as prepared above, comprises a lithium tantalate substrate crystal 2, a film of platinum 4 and a lithium niobate film 6.

Figure 2:
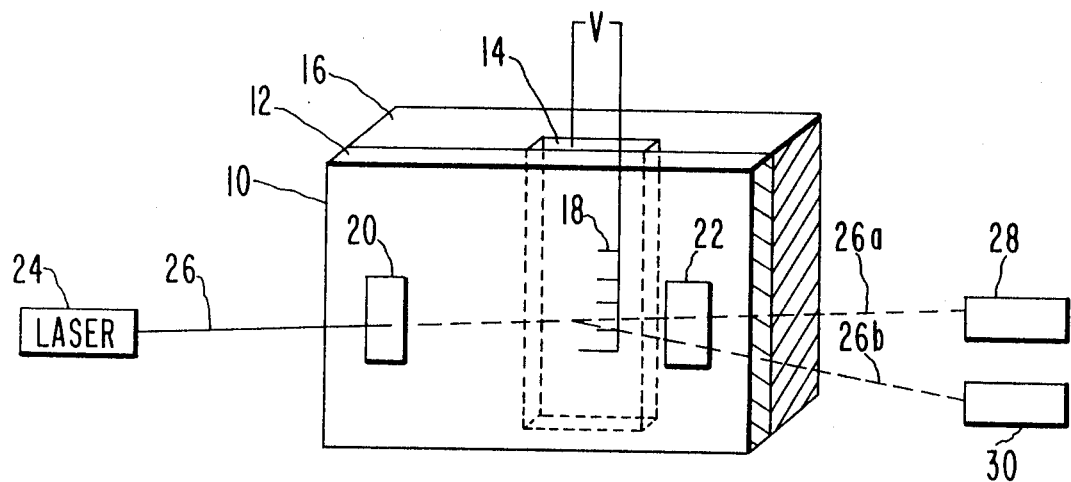
FIG. 2 is a partly schematic view of a deflector modulator employing a film of the invention.

The crystals as prepared above can be used to make an efficient, low cost waveguide deflector modulator. FIG. 2 shows a schematic view of such a deflector. The crystal 10 is a lithium niobate waveguide crystal of the invention. The crystal comprises a film of lithium niobate 12 on a thin film of platinum 14 which is deposited onto a cut lithium tantalate crystal 16. An electrode 18 is deposited onto the lithium niobate crystal film 12. The platinum film 14 acts as the other electrode. Optical input means 20, which can be a strontium titanate optical prism, for example, is disposed on the lithium niobate film 12 on one side of the electrode 18. Optical output means 22 is disposed on the lithium niobate film 12 on the other side of the electrode 18. A laser 24 serves as a source of coherent light.

In operation, a coherent light beam 26 is directed to the input prism 20 and enters the lithium niobate crystal film 12 at a certain angle. Application of a voltage to the electrodes 14 and 18 results in an electro-optically-induced Bragg diffraction grating which diffracts the light entering the crystal film 12, thereby diffracting it at an angle from the original direction. Thus, one portion of the beam 26a travels in the original direction, emerging through one portion of output prism 22 and the deflected portion 26b of the beam travels at an angle to the original direction, emerging through another portion of the output prism 22. The two portions of the beam 26a and 26b can be detected by photomultipliers 28 and 30 respectively for further utilization, as by converting the beam to an electrical signal for further transmission.

The optical waveguides described herein are simple to make, and can be oriented to optimize their properties for a particular application by the choice of the orientation of the lithium tantalate substrate crystal. Electro-optic modulators and switches fabricated thereon have high efficiency and low voltage and power requirements.

EXAMPLE

A film of polycrystalline platinum about 1,500 angstroms thick was deposited onto a Y-cut crystal of lithium tantalate by radio frequency sputtering. A uniform layer of powdered lithium niobate having a particle size of about 5 microns and a mass of about 2.4 milligrams per $cm^2$ of surface area was deposited on the platinum layer by settling from an aqueous suspension. The resultant coated crystal was charged to a furnace at about 1,270°C. for about 5 minutes and cooled to room temperature.

After firing, the lithium niobate had fused to form a single crystal layer about 5 microns thick on the platinum. The lithium niobate had the same orientation and lattice constant as the lithium tantalate substrate, as determined by X-ray diffractometry analysis. The platinum layer after the fusion step had a resistivity of about 3 ohms per square and had an optical transmission corresponding to a platinum layer about 300 angstroms thick.

I claim:

1. An article consisting essentially of an oriented lithium tantalate crystal, a layer of platinum from about 150 to 2,500 angstroms thick thereon and an epitaxial single crystal lithium niobate film on the platinum layer.

2. An article according to claim 1 wherein the platinum layer is discontinuous over the lithium tantalate crystal.

3. A method of forming an epitaxial single crystal layer of lithium niobate on a conducting surface which comprises:
   a. depositing a coating of platinum from 150 to 2,500 angstroms thick on a polished surface of a single crystal lithium tantalate substrate,
   b. depositing a layer of finely divided lithium niobate onto the coated substrate, and
   c. fusing the lithium niobate to form said epitaxial single crystal layer.

4. A method according to claim 3 wherein the platinum layer is from 400 to 1,000 angstroms thick.

5. A method according to claim 3 wherein the fusion step is carried out at a temperature from about 1,260° to 1,275°C.

6. A method according to claim 3 wherein the platinum layer is deposited by radio frequency sputtering.

7. A method according to claim 3 wherein the finely divided lithium niobate particles are below about 30 microns in size.

8. A method according to claim 7 wherein the finely divided lithium niobate particles are from about 5 to about 10 microns in size.

9. In a light modulator comprising a source of coherent light, an optical waveguide, a plurality of electrodes disposed on said waveguide, optical input means disposed on one side of one electrode and optical output means disposed on the other side of said electrode, the improvement which comprises employing as the optical waveguide an article prepared by the method of claim 1.

* * * * *